(12) United States Patent
Zhuge et al.

(10) Patent No.: US 9,319,137 B2
(45) Date of Patent: Apr. 19, 2016

(54) METHODS AND SYSTEMS FOR REDUCED COMPLEXITY NONLINEAR COMPENSATION

(71) Applicants: Qunbi Zhuge, Montreal (CA); Shahab Oveis Gharan, Nepean (CA); Michael Andrew Reimer, Stittsville (CA); Maurice O'Sullivan, Ottawa (CA)

(72) Inventors: Qunbi Zhuge, Montreal (CA); Shahab Oveis Gharan, Nepean (CA); Michael Andrew Reimer, Stittsville (CA); Maurice O'Sullivan, Ottawa (CA)

(73) Assignee: CIENA CORPORATION, Hanover, MD (US)

(*) Notice: Subject to any disclaimer, the term of this patent is extended or adjusted under 35 U.S.C. 154(b) by 0 days.

(21) Appl. No.: 14/480,739

(22) Filed: Sep. 9, 2014

(65) Prior Publication Data

US 2015/0071652 A1   Mar. 12, 2015

Related U.S. Application Data

(60) Provisional application No. 61/875,381, filed on Sep. 9, 2013.

(51) Int. Cl.
*H04B 10/2543* (2013.01)
*H04B 10/516* (2013.01)
*H04B 10/61* (2013.01)
*H04B 10/69* (2013.01)

(52) U.S. Cl.
CPC .......... *H04B 10/2543* (2013.01); *H04B 10/516* (2013.01); *H04B 10/6163* (2013.01); *H04B 10/697* (2013.01)

(58) Field of Classification Search
CPC ........ H04B 10/2543–10/2557; H04B 10/2572; H04B 10/5059; H04B 10/58–10/588; H04B 10/6162–10/6163
See application file for complete search history.

(56) References Cited

U.S. PATENT DOCUMENTS

| | | | | |
|---|---|---|---|---|
| 2002/0060827 A1* | 5/2002 | Agazzi | ............. | G11B 20/10009 398/158 |
| 2011/0249971 A1* | 10/2011 | Oda | ................... | H04B 10/2572 398/65 |
| 2012/0128376 A1* | 5/2012 | Sun | ................... | H04B 10/6162 398/208 |
| 2013/0266311 A1* | 10/2013 | Cao | ................... | H04B 10/2569 398/29 |

* cited by examiner

*Primary Examiner* — David Payne
*Assistant Examiner* — Casey Kretzer
(74) *Attorney, Agent, or Firm* — Kent Daniels; Daniels IP Services Ltd (57) ABSTRACT

Aspects of the present invention provide techniques for compensating nonlinear impairments of a signal traversing an optical communications system. A parallel array of linear convolutional filters are configured to process a selected set of samples of the signal to generate an estimate of a nonlinear interference field. The predetermined set of samples comprises a first sample and a plurality of second samples. A processor applies the estimated nonlinear interference field to the first sample to least partially compensate the nonlinear impairment.

19 Claims, 10 Drawing Sheets

METHODS AND SYSTEMS FOR REDUCED COMPLEXITY NONLINEAR COMPENSATION

CROSS-REFERENCE TO RELATED APPLICATIONS

This application is based on, and claims benefit of, U.S. provisional Patent Application No. 61/875,381 filed Sep. 9, 2013, the entire content of which is hereby incorporated by reference.

TECHNICAL FIELD

The present invention relates to optical communications systems, and more particularly to methods and systems for reduced complexity nonlinear compensation in an optical communications system.

BACKGROUND

The integrity of an optical signal transmitted over long lengths of optical fiber degrades due to nonlinear interference (NLI) generated between different spectral components of the modulated optical field. Following detection, the NLI results in a noise-like degradation of the received signal that, in addition to amplified spontaneous emission (ASE) and other possible sources of noise in the receiver, increases the bit error rate and limits transmission reach. Unlike ASE, however, NLI is in principle predictable, and can be estimated for a known transmit data sequence and from the physical characteristics of the optical fiber link. If the complexity of an NLI estimation algorithm is sufficiently low, NLI can be compensated through appropriate digital signal processing (DSP) at either the transmitter or receiver of a coherent optical transmission system. For coherent transmission, the complexities of present methods of nonlinear pre-compensation grow rapidly with channel memory (in unit intervals, UI, or, equivalently, signalling intervals) to make implementation impractical for systems with channel memories exceeding 100 UI.

Techniques for addressing this limitation are desired.

SUMMARY

Aspects of the present invention provide techniques for compensating nonlinear impairments of a signal traversing an optical communications system. A parallel array of linear convolutional filters are configured to process a selected set of samples of the signal to generate an estimate of a nonlinear interference field. The predetermined set of samples comprises a first sample and a plurality of second samples. A processor applies the estimated nonlinear interference field to the first sample to at least partially compensate the nonlinear impairment.

The present techniques reduce the computational complexity of estimating the NLI developed within the bandwidth of a single optical channel, i.e. intra-channel nonlinearity such as self-phase modulation (SPM), and the NLI developed between adjacent subcarriers of a multiple subcarrier optical modulation, i.e. inter-sub-channel nonlinearity such as cross-phase modulation (XPM) and cross-polarization modulation (XPoIM). Time and frequency domain variants of this NLI compensation algorithm are described. The resulting low-complexity NLI compensation scheme may improve the maximum achievable system margin for 16QAM modulation by ~1 to 2 dB over transmission distances of 1000-2000 km of G.0.652 fiber for a single optical channel comprised of one or more optical subcarriers.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
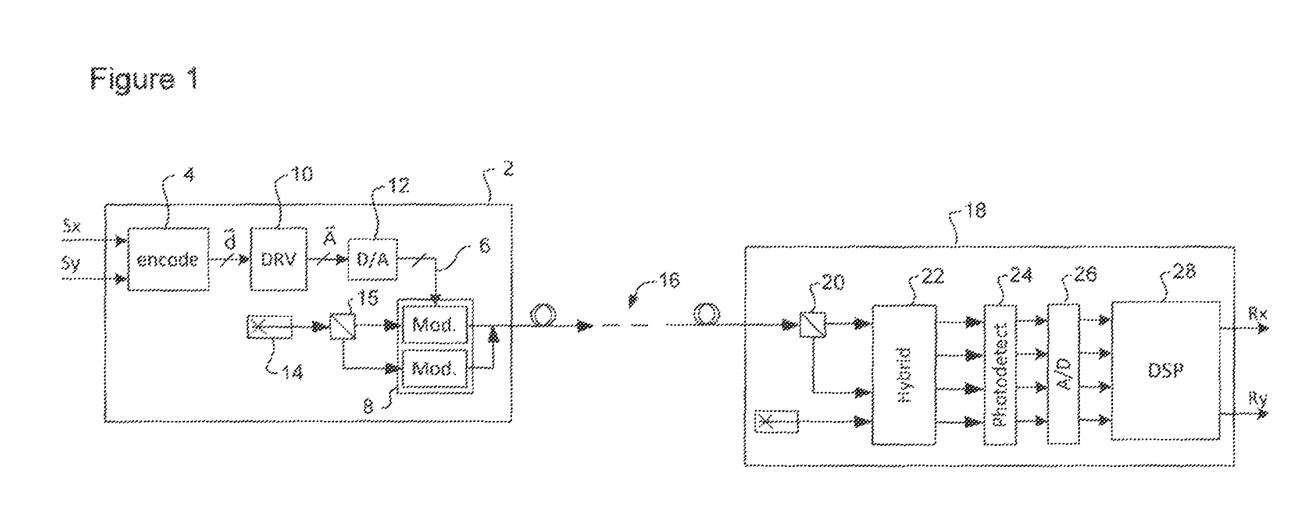
FIG. 1 is a block diagram schematically illustrating elements of an optical communications system in which methods in accordance with the present invention may be implemented.

FIG. 1 illustrates a representative optical communication system in which techniques in accordance with the present disclosure may be implemented. In the optical communication system of FIG. 1, a transmitter 2 generally comprise an encoder 4 for encoding a pair of data signals (Sx and Sy) using an $N_d$-dimensional symbol constellation to generate a drive signal 6. The drive signal is then supplied to a dual-polarization modulator 8 for modulating respective dimensions of a continuous wave (CW) optical carrier in accordance with the drive signal. In the example of FIG. 1, a pair of data signals (Sx and Sy) may be encoded as ($N_d$=4)-dimensional symbols $\vec{d}(k)$=[x(k),y(k)], where x(k) and y(k) are complex-valued components of the k:th transmitted symbol vector $\vec{d}(k)$. Each of the components x(k) and y(k) of the symbol vector $\vec{d}(k)$ are processed by a driver circuit 10 to generate samples $\vec{A}(t_j)$=[x($t_j$), y($t_j$)], where x($t_j$) and y($t_j$) are complex-valued components of $\vec{A}(t_j)$ at the j:th sampling instant $t_j$. Each of the components x($t_j$) and y($t_j$) of the sample vector $\vec{A}(t_j)$ are converted into respective analog drive signals 6 by an Analog-to-digital (A/D) converter block 12 and modulated onto two dimensions (e.g. phase and amplitude, or I and Q) of a respective one of the two orthogonal polarizations of the CW optical carrier. The CW carrier is typically generated by a laser 14 in a manner known in the art, and the dual-polarization modulator 8 may be implemented using a polarization beam splitter 15 and any of a variety of known modulator devices, such as phase modulators, variable optical attenuators, Mach-Zehnder interferometers, etc. The modulated optical signal appearing at the output of the dual-polarization modulator 8 is transmitted through an optical fiber link 16 to a coherent receiver 18.

A receiver 18 configured to receive and detect the transmitted data signals may be provided as a coherent receiver, which includes a polarization beam splitter 20 for splitting the received optical signal into received X and Y polarizations, an optical hybrid 22 for separately mixing the X and Y polarizations with a local oscillator, and a set of photodetectors 24 for detecting the optical power of each of the mixing products generated by the optical hybrid 22. An Analog-to-Digital (A/D) converter block 26 samples each photodetector current, and the resulting sample streams—each of which is related to the modulated dimensions of the optical carrier field—are processed by a Digital Signal Processor 28 in accordance with the $N_d$-dimensional constellation to generate recovered signals Rx and Ry that correspond with the transmitted data signals Sx and Sy.

During transmission through the link 16, the modulated optical signal is subject to distortions due to linear intra-channel effects such as chromatic dispersion, polarization dependent loss, polarization mode dispersion, and nonlinear intra-channel effects such as self-phase modulation, among others. As such, the j:th received sample vector $\vec{R}(t_j)$ detected by the receiver 18 can be related to its corresponding transmitted sample vector $\vec{A}(t_j)$ as $$\vec{R}(t_j) \approx \vec{A}(t_j) + \Delta \vec{a}(t_j) + \vec{n}(t_j) \qquad \text{Eq.1}$$

where $\Delta \vec{a}(t_j)$ is the intra-channel nonlinear interference (NLI) field and $\vec{n}(t_j)$ represents any additional sources of additive noise or distortion, such as, for example, ASE.

The intra-channel NLI field, $\Delta \vec{a}(t_j)$ can be estimated as a sum:

$$\Delta \vec{a}(t_j) \approx \Sigma_{m=-M}^{M} \Sigma_{n=-N}^{N} C_{mn} \vec{A}^H(t_{j+m+n}) \vec{A}(t_{j+n}) \vec{A}(t_{j+m}) \qquad \text{Eq.2}$$

involving interactions between the transmitted sample vector $\vec{A}(t_j)$=[x($t_j$), y($t_j$)], weighted by a complex number, $C_{mn}$, that characterizes the efficiency of the nonlinear interaction. In this formulation, the superscript H denotes the Hermitian conjugate (i.e. the adjoint) of $\vec{A}(t_j)$, while the summation ranges over the number of samples, 2·max(M, N)+1, that interact through chromatic dispersion (i.e. the channel memory). The coefficients $C_{mn}$ quantify all relevant details of the dispersion map and transmitter pulse shape.

As is known in the art, the sample frequency (or rate) will typically be higher than the symbol rate. For example, in conventional Nyquist sampling, the sample frequency (or rate) will typically be twice the bandwidth of a bandlimited signal. Other sampling techniques are known in which the ratio between the sample rate and the signal bandwidth is not equal to 2. Accordingly, in the general case, the present technique will normally be implemented in the "sample domain", with signals being processed on a sample-by-sample basis at the appropriate sample rate. However, for the purpose of understanding the present technique, it is convenient to consider the special case in which the sample rate is equal to that of the symbol rate, and the sample timing corresponds with the symbol timing. In this case, the sample vectors $\vec{A}(t_j)$=[x($t_j$), y($t_j$)] correspond with the symbol vectors $\vec{d}(k)$=[x(k), y(k)], and Eq. 2 above can be reformulated as:

$$\Delta \vec{a}(k) \approx \Sigma_{m=-M}^{M} \Sigma_{n=-N}^{N} C_{mn} \vec{d}^H(k+m+n) \vec{d}(k+n) \vec{d}(k+m) \qquad \text{Eq.2A}$$

The following description will use this special case for the purposes of explaining the present technique, it being understood that it will be appropriate to implement many embodiments in the sample domain, using the corresponding sample-domain formulations.

Figure 2A:
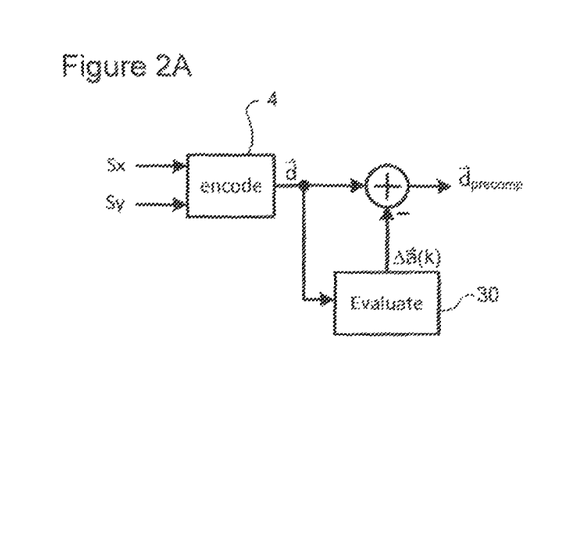
FIGS. 2A and 2B are block diagrams schematically illustrating pre-compensation and post-compensation of nonlinear impairments in accordance with representative embodiments of the present invention.

Referring to FIG. 2A, pre-compensation of the nonlinear interference can be realized by subtracting the estimate $\Delta \vec{a}(k)$ from the transmit data sequence through appropriate digital signal processing at the transmitter:

$$\vec{d}_{precomp}(k) = \vec{d}(k) - \Delta \vec{a}(k) \qquad \text{Eq.3}$$

In the arrangement of FIG. 2A, each successive symbol vector $\vec{d}(k)$=[x(k), y(k)] generated by the encoder 4 is supplied to an evaluator 30 which operates to calculate the intra-channel NLI field $\Delta \vec{a}(k)$ based on both the k:th symbol vector $\vec{d}(k)$ and a plurality of other symbol vectors. The computed value of $\Delta \vec{a}(k)$ is then subtracted from its corresponding symbol $\vec{d}(k)$ to yield $\vec{d}_{precomp}(k)$, which can then be supplied to the drive circuit 10 and modulators 8 for transmission.

Figure 2B:
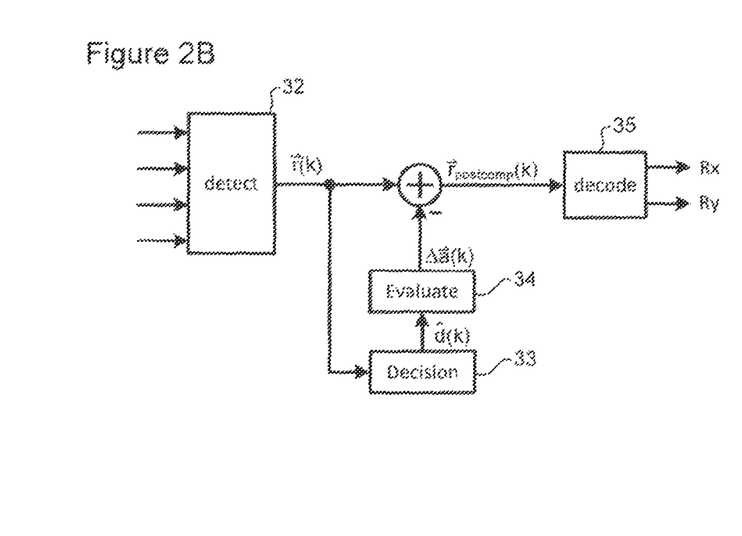

As may be seen in FIG. 2B, post-compensation of NLI can be realized by subtracting the estimate $\Delta\vec{a}(k)$ from the received data sequence through appropriate DSP at the receiver $$\vec{r}_{postcomp}(k)=\vec{r}(k)-\Delta\vec{a}(k) \qquad \text{Eq.4}$$

In the arrangement of FIG. 2B, sample streams generated by the A/D converter block 26 are processed by a detector 32 to recover symbol vectors $\vec{r}(k)$, which are supplied to a decision block 33 that operates to generate estimates of the transmitted symbol vectors, $\hat{d}(k)$. The transmitted symbol estimates $\hat{d}(k)$ are then supplied to an evaluator 34 which operates to calculate the intra-channel NLI field $\Delta\vec{a}(k)$ (which may be computed according to Eq. 2A above by replacing $\vec{d}(k)$ with the estimated $\hat{d}(k)$) based on both the k:th transmitted symbol estimate $\hat{d}(k)$ and a plurality of other transmitted symbol estimates. The computed value of $\Delta\vec{a}(k)$ is then subtracted from its corresponding symbol $\vec{r}(k)$ to yield $\vec{r}_{postcomp}(k)$, which can then be supplied to a decoder 35 to determine appropriate values of the recovered signals Rx and Ry.

In both pre- and post-compensation scenarios, the practicality of compensating intra-channel interference (and especially NLI such as self-phase modulation) largely depends upon the computational complexity involved in the evaluation of $\Delta\vec{a}(k)$. This, in turn, is a function of the channel memory. For example, it can be shown that for practical optical fiber links of between 1000 and 2000 km in length, the evaluation of Eq. 2A above may require the summation of over 10000 terms.

In accordance with the present technique, $\Delta\vec{a}(k)$ can be evaluated using a parallel series of linear convolutional filters operating on the product $\vec{d}^H(k+m+n)\vec{d}(k+n)$ of transmit symbol vectors $\vec{d}(k)$. With this arrangement, an equivalent of 15 complex multiplies per symbol to evaluate $\Delta\vec{a}(k)$ can be achieved for channel memories of ~100 UI through appropriate quantization of the $C_{mn}$ coefficients. This represents a reduction in complexity equivalent to a factor of 13 relative to the calculation of the double summation involved in Eq. 2A above.

Figure 3:
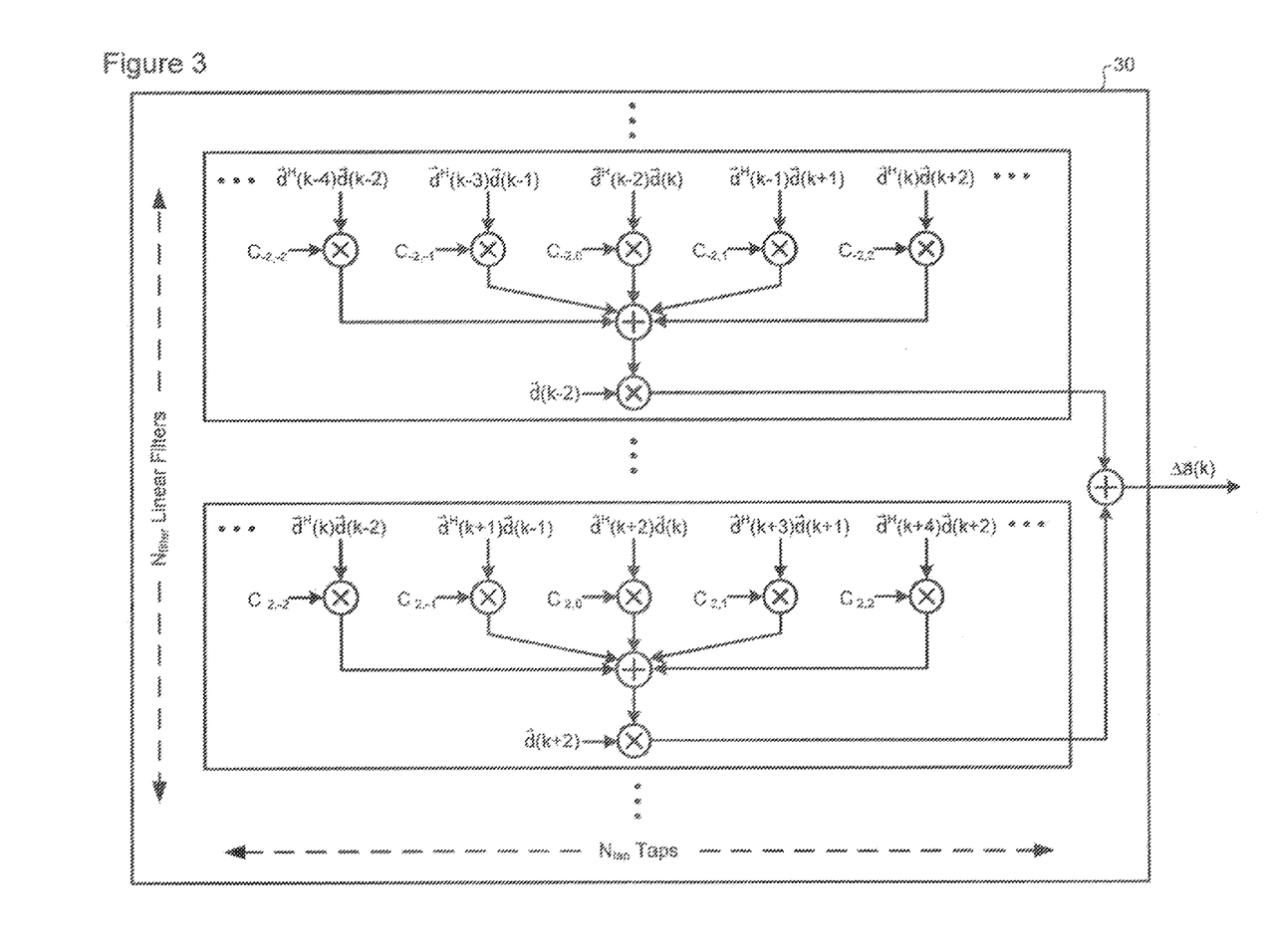
FIG. 3 is a block diagram schematically illustrating elements of an evaluator of FIG. 2A.

FIG. 3 schematically illustrates an embodiment of the evaluator 30 in which parallel linear convolutional filters are used to evaluate $\Delta\vec{a}(k)$ in the time-domain. In the embodiment of FIG. 3, the evaluator 30 comprises a set of $N_{filter}$ linear filters, each of which includes $N_{tap}$ filter taps. Each filter tap computes the product $C_{mn}\vec{d}^H(k+m+n)\vec{d}(k+n)$ for a respective value of (m, n), and the results are then summed together and multiplied by $\vec{d}(k+m)$. The outputs of the $N_{filter}$ linear filters are then summed to calculate $\Delta\vec{a}(k)$. With this architecture, the correction field $\Delta\vec{a}(k+1)$ at the next symbol index k+1 requires only $(N_{filter}-1)/2+1$ additional evaluations of the product $\vec{d}^H(k+1+m+n)\vec{d}(k+1+n)$; that is, for m=0, 1, . . . , $(N_{filter}-1)/2$. In the embodiment of FIG. 3, the index "m" identifies a respective one of the linear convolutional filters, and the index "n" identifies a respective tap within a given linear convolutional filter.

In the typical case where the coefficients have $C_{mn}=-C^*_{m,-n}$ symmetry, the required number of linear filters is reduced by a factor of ~2.

In embodiments in which the coefficients $C_{mn}$ are quantized to a sufficiently small number of discrete levels, the linear convolutional filters can be replaced by summations without significantly reducing system performance. This technique can yield satisfactory performance when the coefficients $C_{mn}$ are quantized to 4 discrete levels or less.

In dispersion uncompensated networks, the memory length of the optical channel is minimized with 50% electronic CD pre-compensation applied through appropriate DSP at the transmitter. In this case, the required number of linear filters is reduced by a factor of ~2. Further, when the electronic CD pre-compensation is optimized in systems with arbitrary optical dispersion compensation, the coefficients $C_{mn}$ are (approximately) imaginary valued. Under these conditions, the required number of complex operations is also reduced by a factor of ~2.

In networks with a high degree of optical dispersion compensation, $N_{filter}$ may range from $N_{filter}=1$ to $N_{filter}=4$.

As may be appreciated, the above techniques may be implemented individually or in combination. In some embodiments, $\Delta\vec{a}(k)$ may be evaluated in the optical transmitter, and used to pre-compensate the optical signal prior to transmission. In other embodiments, $\Delta\vec{a}(k)$ may be evaluated in the optical receiver, and used to post-compensate the optical signal received through the link 12.

Figure 4A:
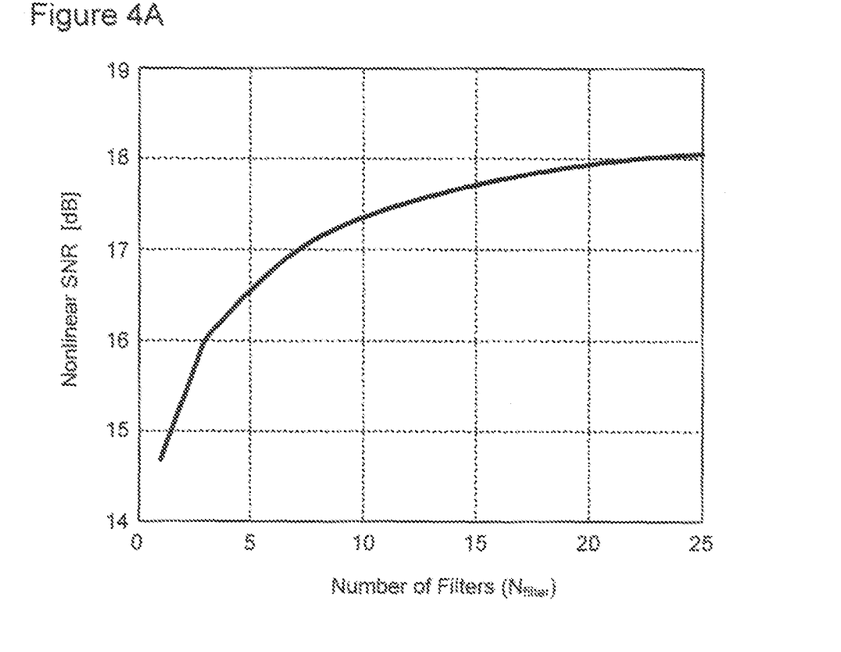
FIGS. 4A and 4B are charts schematically illustrating representative performance of the embodiments of FIGS. 2-3 as a function of number of parallel convolutional filters for polarization multiplexed 16QAM modulation (PM-16QAM) over 1040 km standard single mode fiber (SMF)
Figure 4B:
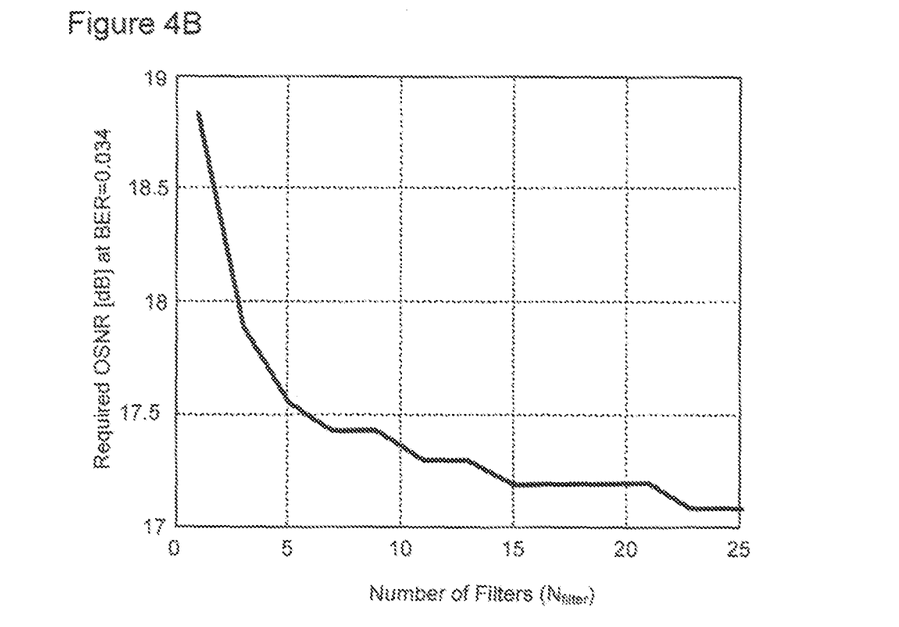

FIGS. 4A and 4B illustrate the performance of pre-compensation using $\Delta\vec{a}(k)$ as calculated with the evaluator 30 of FIG. 3, as a function of the number $N_{filter}$ of linear filters, for polarization multiplexed 16QAM modulation (PM-16QAM) over 1040 km dispersion uncompensated standard single mode fiber (SMF). As may be seen in these figures, both the nonlinear signal-to-noise ratio (SNR) and the required optical signal-to-noise ratio (ROSNR), evaluated at an uncoded bit-error rate (BER) of 0.034, improve with an increasing number of filters, with the majority of the improvement occurring with $N_{filter}<10$ filters. This implies that reasonable performance can be obtained using an evaluator having $N_{filter}=10$ linear filters, which, using the simplification techniques described above, implies an evaluator having 6 taps per filter for a total of 32 complex multipliers and 21 adders. Increasing the number of linear filters beyond $N_{filter}=10$ can yield further increases in performance, but the rate of improvement is significantly lower than that obtained with $N_{filter}<10$.

Figure 5A:
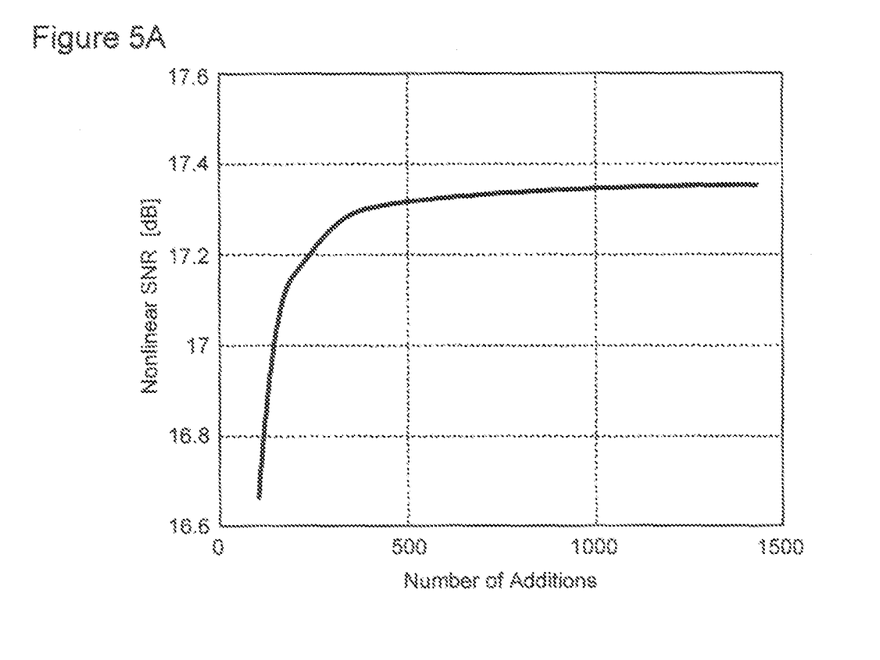
FIGS. 5A and 5B are charts schematically illustrating the representative performance of a variant of the embodiments of FIGS. 2-3, as a function of the number of additions employed in the NLI compensation, for PM-16QAM transmitted over 1040 km SMF.
Figure 5B:
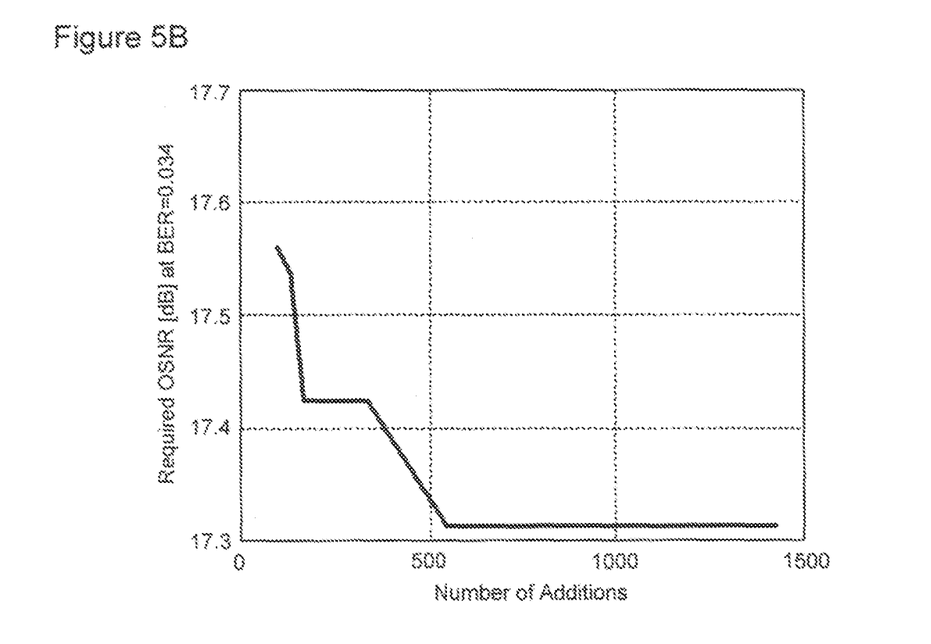

As noted above, the filter taps can be realized by additions instead of multiplications. For example, if $C_{mn}$ is constant for a given index m, then a next successive filter output can be obtained by subtracting the final filter input (e.g. $\vec{d}^H(k-4)\vec{d}(k-2)$) and adding the new input (e.g. $\vec{d}^H(k+1)\vec{d}(k+3)$). The number of additions required to perform this operation depends on the quantization level of $C_{mn}$. As noted above, satisfactory results may be obtained by using values of $C_{mn}$ having up to four quantization levels. FIGS. 5A and 5B illustrate performance of pre-compensation using $\Delta\vec{a}(k)$ evaluated using this technique, as a function of the number of additions for PM-16QAM transmitted over 1040 km dispersion uncompensated SMF. As may be seen in these figures, performance improves with an increasing number of additions, with the majority of the improvement occurring with <300 additions. This implies that reasonable performance can be obtained when the number of quantization levels of $\Delta\vec{a}(k)$ is selected to yield ~300 additions. Increasing the number of quantization levels (and therefore the number of additions)

can yield further increases in performance, but the rate of improvement is lower than that obtained when the number of additions is <300.

Figure 6:
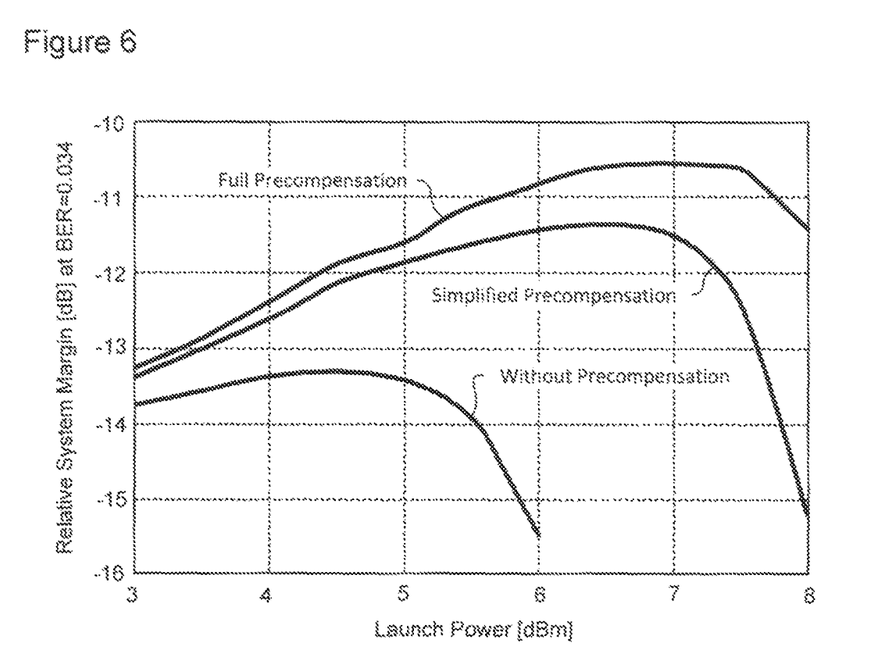
FIG. 6 is a chart illustrating a representative comparison between the Relative System Margin (RSM) for PM-16QAM transmitted over 1040 km SMF without NLI compensation; full complexity NLI compensation; and the simplified NLI compensation in accordance with embodiments of the present invention.

FIG. 6, illustrates the relative system margin (RSM) versus Launch Power in an optical link using full complexity NL pre-compensation (i.e. following Equation 2A above), simplified Time-Domain NL pre-compensation using the methods described above with reference to FIGS. 3-5, and with no NL pre-compensation, for PM-16QAM over 1040 km dispersion uncompensated SMF. Here, the RSM, $RSM_{dB} = P_{dBm} - RSNR_{dB}$, in units of decibels, is taken to be the difference between the channel's average power, $P_{dBm}$, and the required electrical signal-to-noise ratio, $RSNR_{dB}$, at an uncoded BER of 0.034. As may be seen in FIG. 6, the full complexity NL pre-compensation can ideally achieve a 2.7 dB Maximum RSM (MSM) improvement as compared to no NL pre-compensation. By comparison, the simplified NL pre-compensation technique (using 32 complex multipliers, 21 adders and 6 taps per filter) can achieve a 2 dB MSM improvement as compared to the case of no NL precompensation, but with dramatically less processing complexity (and thus cost) than is required for full complexity NL pre-compensation.

Figure 7:
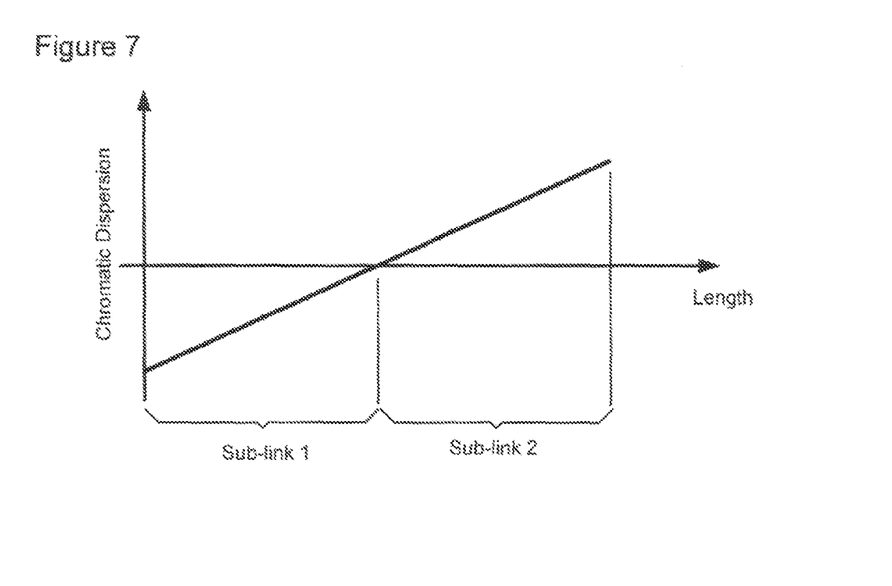
FIG. 7 is a diagram illustrating a link divided into two sub-links by means of partial electronic compensation of chromatic dispersion (CD) at the optical transmitter.

The paragraphs above describe techniques for pre- and post-compensation of nonlinear impairments using a simplified time-domain evaluation of the intra-channel nonlinear interference field, $\Delta \vec{a}(k)$. In some embodiments, these techniques may be used in conjunction with electronic Chromatic Dispersion (CD) pre- and/or post-compensation. In some embodiments, approximately 50% of the link CD may be compensated in each of the transmitter and receiver. In particular, in the case of dispersion uncompensated systems with 50% electronic CD pre-compensation, the fiber link can be considered to be the concatenation of two constituent sub-links as shown in FIG. 7.

For the case in which the total length of the link is 1040 km, the $C_{mn}$ coefficients for the entire link can be calculated as:

$$C_{mn}(1040 \text{ km}) - C_{mn}(520 \text{ km}, -\beta_2) + C_{mn}(520 \text{ km}, \beta_2)$$

Ignoring the effects of attenuation, the coefficients of the two constituent sub-links satisfy $C_{mn}(520 \text{ km}, -\beta_2) = -C^*_{mn}(520 \text{ km}, \beta_2)$ and, consequently, the final $C_{mn}(1040 \text{ km})$ coefficients are purely imaginary. Moreover, $C_{mn}(1040 \text{ km})$ are concentrated near the m=0 and n=0 axes, implying that the required number of terms in Eq. 2A can be significantly reduced while maintaining equivalent system performance. Further, with optimum electronic CD pre-compensation, the $C_{mn}$ coefficients can be quantized to ≤4 discrete levels with <0.2 dB reduction in system performance.

Figure 8:
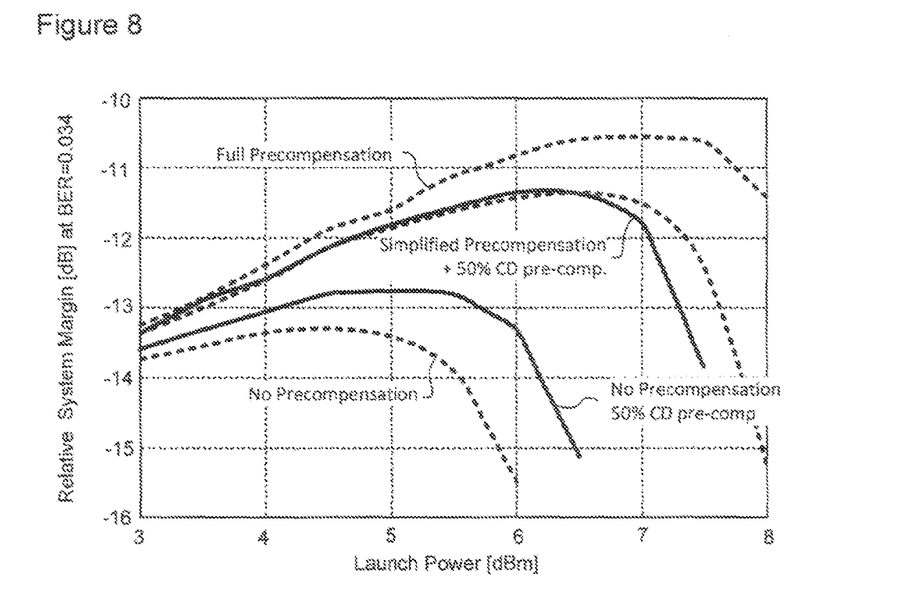
FIG. 8 is a chart illustrating the representative effect of partial electronic compensation of chromatic dispersion (CD) at the optical transmitter, in combination with simplified NLI compensation in accordance with embodiments of the present invention for a single PM-16QAM optical subcarrier with 131.25 GHz modulation bandwidth transmitted over 1040 km SMF.

FIG. 8 illustrates the effect of the above-noted simplified NL pre-compensation in combination with 50% electronic CD pre-compensation for PM-16QAM transmitted over 1040 km dispersion uncompensated SMF. For ease of comparison, the performance curves from FIG. 6 are replicated in dashed lines. In the illustrated example, the simplified NL pre-compensation is implemented with an evaluator 30 comprising only 10.5 complex multipliers and 26 additions. As may be seen in FIG. 8, 50% electronic CD pre-compensation alone without NL pre-compensation yields a small, 0.5 dB improvement in MSM. The combination of simplified NL pre-compensation and 50% electronic CD pre-compensation reduces the MSM by ~0.6 dB as compared to full complexity NL pre-compensation (FIG. 6). This implies that the use of electronic CD pre-compensation in combination with the present simplified NL pre-compensation techniques achieves a performance comparable to the full complexity implementation.

The above paragraphs describe embodiments in which the NLI field, $\Delta \vec{a}(k)$, is evaluated in the time domain using $2 \cdot (M+N)+1$ successive dual-polarization transmit symbol vectors, $\vec{d}(k)$. If desired, the NLI field may be evaluated using an array of band-pass filters that separate the modulated optical field, $\vec{A}(t)$, into a number of spectral sub-bands, $N_{SB}$. The intra-sub-band and inter-sub-band NLI fields are evaluated for each sub-band and the results recombined to obtain the total NLI field estimate associated with $\vec{A}(t)$. Letting $\vec{A}(\omega)$ be the frequency-domain representation of $\vec{A}(t)$, the modulated optical field is decomposed into $N_{SB}$ sub-bands, $\vec{B}_l(\omega)$, so that $$\vec{A}(\omega) = \Sigma_{l=1}^{N_{SB}} \vec{B}_l(\omega - \Omega_l). \qquad \text{Eq. 5}$$

Here, $\Omega_l$ denotes the center frequency of the l:th sub-band, while, in what follows, $\vec{B}_l(t)$ is the time-domain representation of $\vec{B}_l(\omega)$. Including both intra- and inter-sub-band nonlinear interactions, the NLI field, $\Delta \vec{a}_l(t_j)$, of the l:th sub-band at sampling instant $t_j$, is estimated as $$\Delta \vec{a}_l(t_j) \approx \qquad \text{Eq. 6}$$

$$\sum_{l_1=(1-l)}^{N_{SB}-l} \sum_{l_2=(1-l-l_1)}^{N_{SB}-l-l_1} \sum_{m=-M_{l_1}}^{M_{l_1}} \sum_{n=N_{l_1}}^{N_{l_1}} C_{mn}(l_1, l_2) \vec{B}^H_{l+l_1+l_2}(t_{j+m+n}) \vec{B}_{l+l_2}(t_{j+n})$$

$$\vec{B}_{l+l_1}(t_{j+m})$$

involving $\vec{B}_l(t_j)$ of differing sub-bands, weighted by a complex number, $C_{mn}(l_1, l_2)$, that characterizes the efficiency of the nonlinear interaction. For example, in Eq. 6 the intra-sub-band nonlinear field is described by those terms with ($l_1=0$, $l_2=0$), while the largest contributions to the inter-sub-band nonlinear field occur whenever ($l_1=0$, $l_2\neq 0$) or ($l_1\neq 0$, $l_2=0$). Terms appearing in Eq. 6 with ($l_1\neq$, $l_2\neq 0$) are associated with four-wave-mixing processes, and are typically negligible in optical fibers with non-zero chromatic dispersion. The number of samples that interact through chromatic dispersion, described by $M_l$ and $N_l$, in general depend upon the sub-band index l.

The total NLI field estimate, $\Delta \vec{a}(t_j)$, is obtained from $\Delta \vec{a}_l(t_j)$ by evaluating $\Delta \vec{a}_l(\omega_n)$ at the discrete sample-frequency $\omega_n$ through an appropriate Discrete Fourier Transform (DFT) of $\Delta \vec{a}_l(t_j)$. A filter $H_l(\omega_n)$ is selected to limit the spectral extent of $\Delta \vec{a}_l(\omega_n)$ and the total nonlinear field $$\Delta \vec{a}(\omega_n) = \Sigma_{l=1}^{N_{SB}} H_l(\omega_n - \Omega_l) \Delta \vec{a}_l(\omega_n - \Omega_l) \qquad \text{Eq. 7}$$

is computed. The time-domain received optical field $\vec{R}(t_j)$, incident upon the receiver 14 is then related to the corresponding transmitted optical field, $\vec{A}(t_j)$, through $$\vec{R}(t_j) \approx \vec{A}(t_j) + \Delta \vec{a}(t_j) + \vec{n}(t_j) \qquad \text{Eq. 8}$$

where $\Delta \vec{a}(t_j)$ is the inverse-DFT of $\Delta \vec{a}(\omega_n)$ and $\vec{n}(t_j)$ represents any additional sources of additive noise or distortion.

In accordance with the present technique, Eq. 6 can be evaluated using a parallel series of linear convolutional filters operating on the terms $\vec{B}^H_{l+l_1+l_2}(t_{j+m+n}) \vec{B}_{l+l_2}(t_{j+n})$. The complexity of the linear convolutional filters can be significantly reduced using the techniques outlined in the preceding discussion.

It is known in the art that modulating data onto multiple optical subcarriers, with Nyquist or near-Nyquist subcarrier frequency separation, can increase tolerance to nonlinear interference, particularly when the total modulation bandwidth exceeds ~50 GHz. In this embodiment, $\vec{B}_l(t_j)$ and $\Delta \vec{a}_l(t_j)$ in Eq. 6 are identified as the modulated optical field and NLI field of the l:th optical subcarrier, respectively.

For the special case in which the sampling rate is equal to the subcarrier symbol rate them at appropriate sampling phase, the sample vectors $\vec{B}_l(t_j)$ and $\Delta \vec{a}_l(t_j)$ correspond with the symbol vectors $\vec{d}_l(k)$ and $\Delta \vec{a}_l(k)$, respectively, and Eq. 6 above can be reformulated as:

$$\Delta \vec{a}_l(k) \approx \sum_{l_1=(1-l)}^{N_{SC}-l} \sum_{l_2=(1-l-l_1)}^{N_{SC}-l-l_1} \sum_{m=-M_{l_1}}^{M_{l_1}} \sum_{n=-N_{l_1}}^{N_{l_1}} C_{mn}(l_1, l_2) \vec{d}_{l+l_1+l_2}^H(k+m+n)$$
$$\vec{d}_{l+l_2}(k+n) \vec{d}_{l+l_1}(k+m) \quad \text{Eq. 9}$$

where $N_{SC}$ is the number of modulated subcarriers. The received symbol vector $\vec{r}_l(k)$ of the l:th subcarrier detected by the receiver 14 can be related to its corresponding transmitted symbol vector $\vec{d}_l(k)$ as $$\vec{r}_l(k) \approx \vec{d}_l(k) + \Delta \vec{a}_l(k) + \vec{n}_l(k) \quad \text{Eq. 10}$$

where $\vec{n}_l(k)$ represents any additional sources of additive noise or distortion.

Pre-compensation or post-compensation of intra- and inter-subcarrier NLI is realized by subtracting the estimate $\Delta \vec{a}_l((k)$ from either the transmit, $\vec{d}_l(k)$, or received, $\vec{r}_l(k)$, symbol vectors, respectively.

Figure 9A:
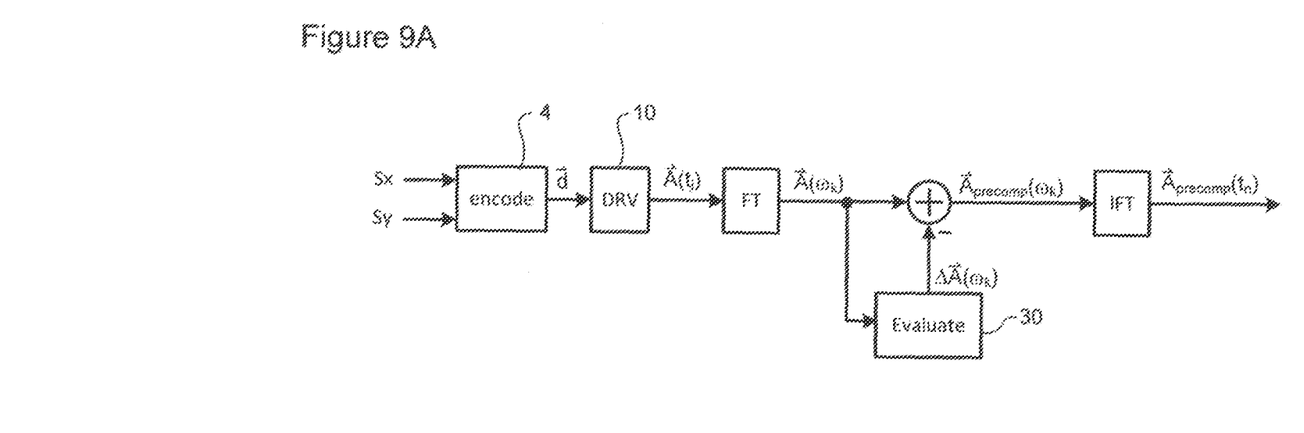
FIGS. 9A and 9B are diagrams schematically illustrating frequency domain pre-compensation of NLI in accordance with another representative embodiment of the present invention.
Figure 10:
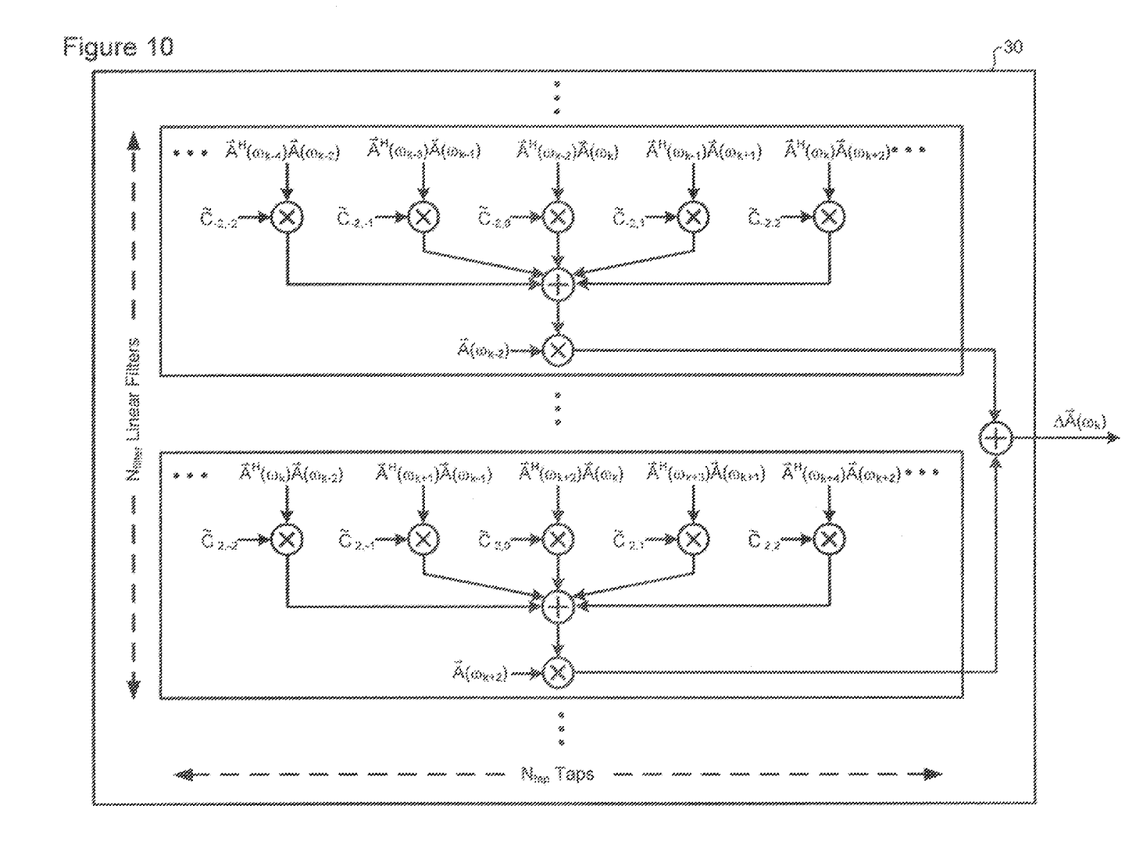
FIG. 10 is a block diagram schematically illustrating elements of an evaluator of FIG. 9A.

The above paragraphs describe embodiments in which $\Delta \vec{a}(k)$ is evaluated in the time domain, using $2 \cdot (M+N)+1$ successive dual-polarization transmit symbol vectors $\vec{d}(k)$. If desired, the nonlinear interference may also be evaluated in the frequency domain. FIG. 9A illustrates an example embodiment that may be implemented in the transmitter 2. In this case, the stream of $\vec{A}(t_j)$ output from the encoder 4 are supplied to a Fourier Transform (FT) block, which computes a corresponding series of signal vectors $\vec{A}(\omega_k)$ representing the DFT of $\vec{A}(t_j)$. The vectors $\vec{A}(\omega_k)$ are supplied to an evaluator which operates to compute the intra-channel nonlinear interference field, $\Delta \vec{A}(\omega_k)$, which is subtracted from $\vec{A}(\omega_k)$ to yield a pre-compensated signal vector $\vec{A}_{precomp}(\omega_k)$. The pre-compensated vector $\vec{A}_{precomp}(\omega_k)$ is then supplied to an inverse Fourier Transform block, which computes the inverse-DFT of $\vec{A}_{precomp}(\omega_k)$ to generate the time domain pre-compensated signal vector $\vec{a}_{precomp}(t_k)$. In some embodiments, the intra-channel nonlinear interference field $\Delta \vec{A}(\omega_k)$ can be computed by the evaluator according to $$\Delta \vec{A}(\omega_k) \approx \sum_{m=-M}^{M} \sum_{n=-N}^{N} \tilde{C}_{mn} \vec{A}^H(\omega_{k+m+n}) \vec{A}(\omega_{k+n})$$
$$\vec{A}(\omega_{k+m}) \quad \text{Eq. 11}$$

in which $\vec{A}^H$ is the Hermitian conjugate (i.e. the adjoint) of $\vec{A}$ and $\omega_k$ is the k:th sample frequency of $\vec{A}(\omega)$ or $\vec{A}^H(\omega)$, as applicable. The coefficient, $\tilde{C}_{mn}$, is a complex number characterizing the efficiency of the frequency domain nonlinear interaction. The summation ranges over the frequency bins within a (provisionable) bandwidth $\Delta \omega$. The summation can be implemented as a parallel series of linear filters, as may be seen in FIG. 10. As in the embodiment of FIG. 3, in the embodiment of FIG. 10 the evaluator 30 comprises a set of $N_{filter}$ linear filters, each of which comprises a set of $N_{tap}$ filter taps. Additionally, the index "m" identifies a respective one of the linear convolutional filters and the index "n" identifies a respective tap within a given linear convolutional filter. In the embodiment of FIG. 10, however, each filter tap computes the product $\tilde{C}_{mn} \vec{A}^H(\omega_{k+m+n}) \vec{A}(\omega_{k+n})$ for a respective value of (m, n), and the results are then summed together and multiplied by $\vec{A}(\omega_{k+n})$.

Figure 9B:
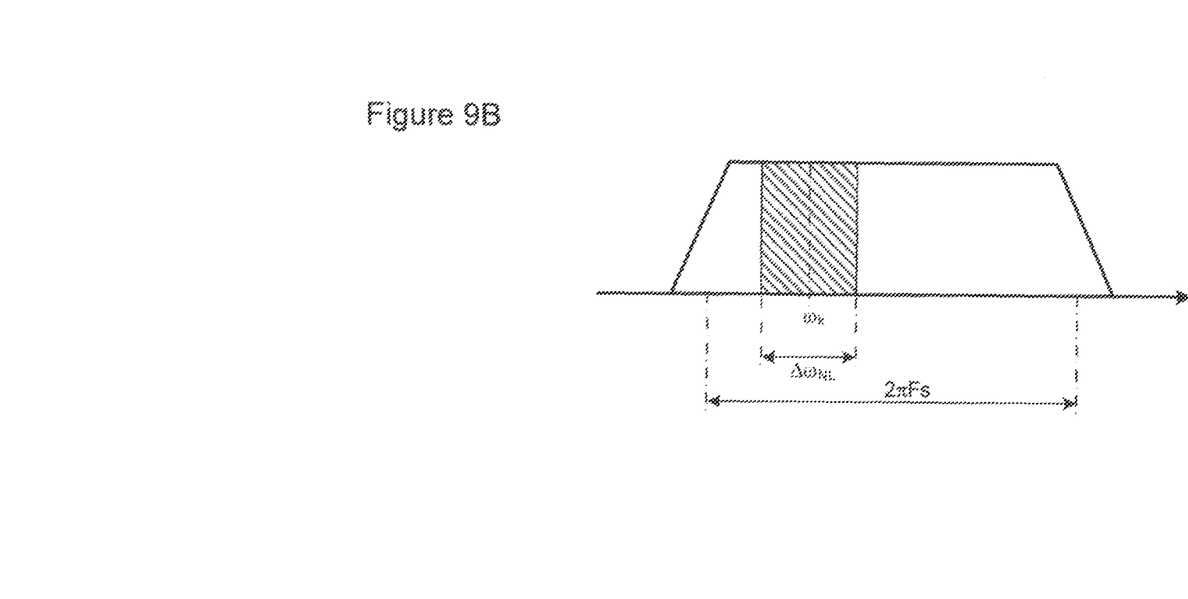

The performance of the frequency domain NL pre-compensation improves with increasing bandwidth $\Delta \omega$ and approaches a limiting value for some $\Delta \omega_{NL}$, termed the nonlinear bandwidth, which is related to fiber type and link length. For high net dispersion systems, $\Delta \omega_{NL}$ is generally less than $2 \pi F_S$ where $F_S$ is the transmitter modulation bandwidth. It follows that the NL pre-compensation can be applied within a window of spectral width $\Delta \omega_{NL}$ centered on the k:th discrete sample-frequency, $\omega_k$, as shown in FIG. 9B. In this case, the complexity of the NL pre-compensation implementation increases linearly with the modulation bandwidth, implying that the computational complexity per discrete frequency sample $\omega_k$ is constant. Accordingly, in some embodiments the evaluator may operate to compute $\Delta \vec{A}(\omega_k)$ for each frequency sample $\omega_k$ using only those frequency samples lying within the frequency range $$\omega_k \pm \frac{1}{2} \Delta \omega_{NL}.$$

This can reduce the number of linear filters required to implement the evaluator to match the number of frequency samples lying within the window. With this arrangement, $\Delta \vec{A}(\omega_k)$ may be calculated by "sliding" the window across the vector $\vec{A}(\omega_k)$ output from the FT block, and determining a respective value of $\Delta \vec{A}(\omega_k)$ for each k.

As may be appreciated, complexity of the Frequency Domain evaluator also depends on the length of the DFT employed within the FT block. For NL pre-compensation, the channel memory within each spectral window $$\omega_k - \frac{1}{2} \Delta \omega_{NL} < \omega < \omega_k + \frac{1}{2} \Delta \omega_{NL}$$

is linearly proportional to the modulation bandwidth. Accordingly, the DFT length in the FT block must also increase in proportion to the modulation bandwidth. However, since the number of linear filters required to implement NL pre-compensation is determined solely by $\Delta \omega_{NL}$, the implementation complexity per frequency sample $\omega_k$ is again independent of modulation bandwidth.

Figure 11:
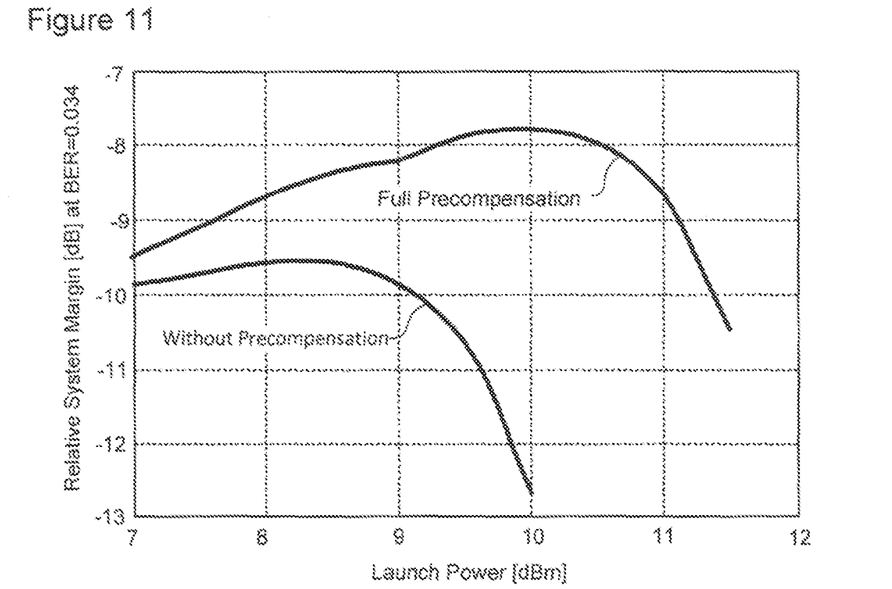
FIG. 11 is a chart illustrating the RSM of the embodiment of FIGS. 9 and 10 as a function of optical Launch Power, for PM-16QAM modulation with and without full complexity NLI compensation, for a single optical carrier with 131.25 GHz modulation bandwidth transmitted over 1040 km SMF.

FIG. 11 compares the RSM with and without frequency domain NL pre-compensation, respectively. For PM-16QAM transmitted over 1040 km dispersion uncompensated SMF. This calculation employed a single optical subcarrier with $F_S=131.25$ GHz modulation bandwidth, an 8192 sample DFT with 50% overlap-and-save, 50% electronic CD pre-compensation, $\Delta \omega_{NL} \approx 33$ GHz and a 256×256 coefficient matrix $\tilde{C}_{mn}$.

As shown in FIG. 11, the frequency domain NL pre-compensation in this case results in a maximum 1.8 dB improvement in MSM.

Figure 12:
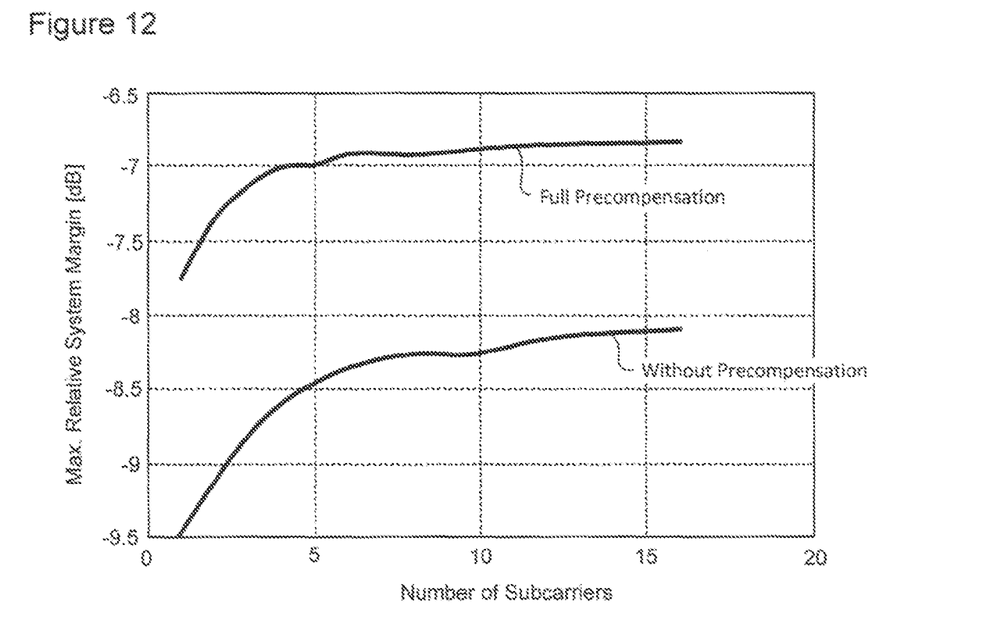
FIG. 12 is a chart illustrating the Maximum RSM (MSM) of the embodiment of FIGS. 9 and 10, as a function of the number of PM-16QAM modulated optical subcarriers occupying a 131.25 GHz modulation bandwidth, with and without full complexity, frequency domain NLI compensation, transmitted over 1040 km SMF.

FIG. 12 illustrates the MSM improvement vs. Member of Subcarriers both with and without NL pre-compensation, respectively, under the same conditions as FIG. 11, except that the signal spectrum was comprised of a number of modulated optical subcarriers. As may be seen in FIG. 12, the use of 12 optical subcarriers in combination with full complexity NL precompensation yields a maximum 2.6 dB MSM improvement relative to a single subcarrier without NL pre-compensation. In embodiments in which a large number of optical subcarriers are used, the size of the DFT may be reduced. For example, in some embodiments, a DFT length of 2048 samples may be used without significantly reducing the MSM.

Figure 13:
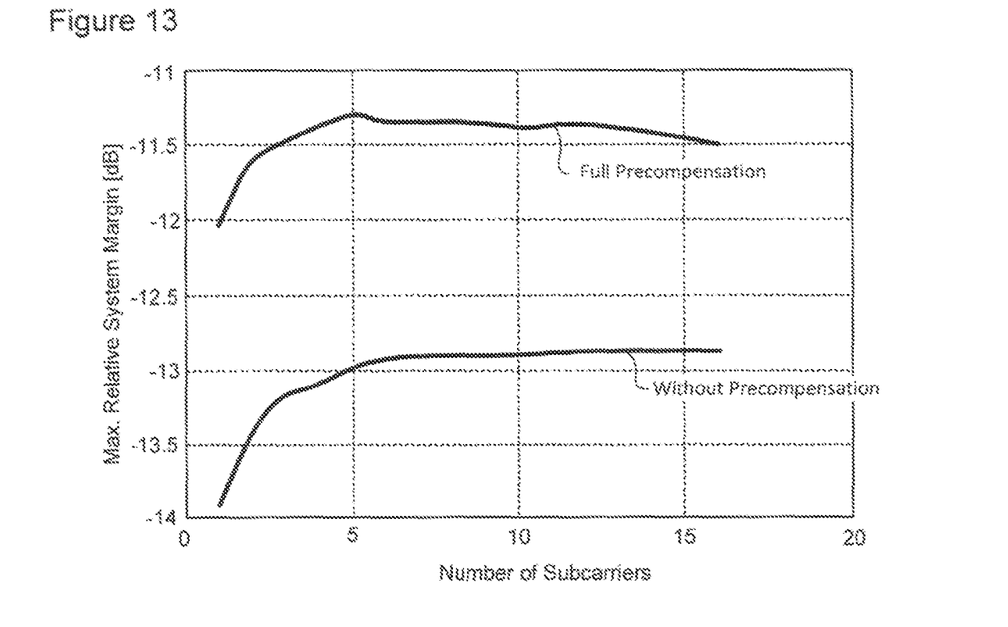
FIG. 13 is a chart illustrating a second representative MSM of the embodiment of FIGS. 9 and 10, as a function of the number of PM-16QAM modulated optical subcarriers occupying a 131.25 GHz modulation bandwidth, with and without full complexity, frequency domain NLI compensation, transmitted over 1040 km TrueWave Classic (TWc) fiber.

FIG. 13 illustrates the MSM improvement vs. Number of Subcarriers both with and without NL pre-compensation, respectively, under the same conditions as FIG. 12, except for 1040 km dispersion uncompensated True Wave Classic (TWc) fiber with a local dispersion of 2.8 ps/nm/km and a 1024 sample DFT with 50% overlap-and-save. As shown in FIG. 13, frequency domain NL pre-compensation with 5 optical subcarriers yields a 2.6 dB increase in MSM relative to a single optical subcarrier without NL pre-compensation.

Figure 14:
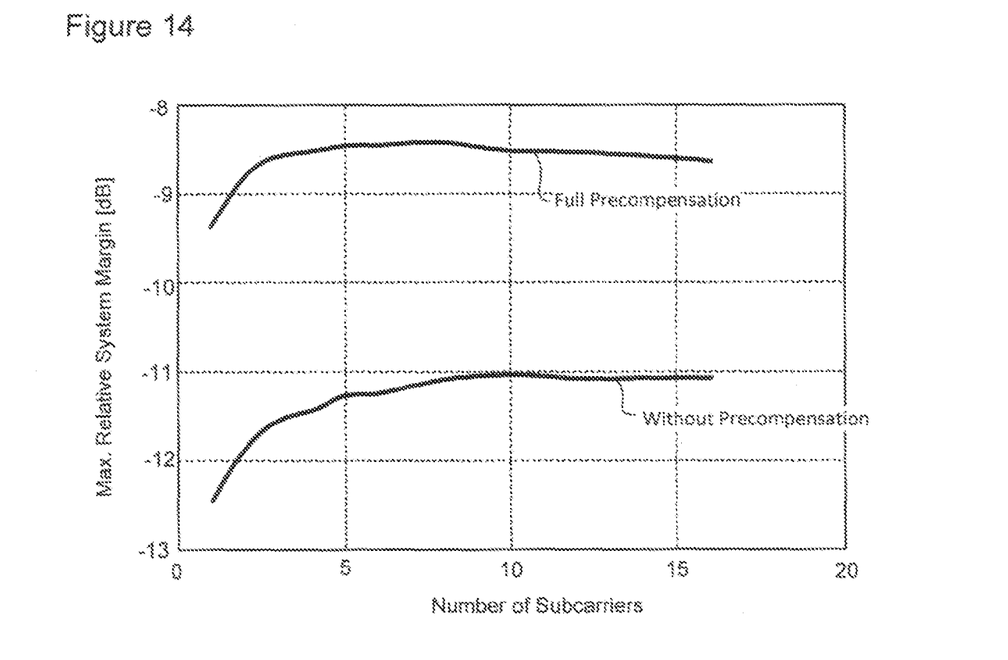
FIG. 14 is a chart illustrating a third representative MSM of the embodiment of FIGS. 9 and 10, as a function of the number of PM-16QAM modulated optical subcarriers occupying a 131.25 GHz modulation bandwidth, with and without full complexity, frequency domain NLI compensation, transmitted over 1040 km SMF with 90% inline optical dispersion compensation.

FIG. 14 illustrates the MSM improvement vs. Number of Subcarriers both with and without NL pre-compensation, respectively, under the same conditions as FIG. 12, except for 1040 km SMF with 90% inline optical dispersion compensation and a 1024 sample DFT with 50% overlap-and-save. As shown in FIG. 14, frequency domain NL pre-compensation with 8 optical subcarriers yields a 4.0 dB increase in MSM relative to a single optical subcarrier without NL pre-compensation.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical and/or optical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. An apparatus for compensating a nonlinear impairment of a signal traversing an optical communications system, the apparatus comprising:
a parallel array of linear convolutional filters configured to process a selected set of samples of the signal to calculate an estimate of a nonlinear interference field, the selected set of samples comprising a first sample and a plurality of second samples; and
a processor configured to apply the estimated nonlinear interference field to the first sample so as to at least partially compensate the nonlinear impairment;
wherein either:
the selected set of samples of the signal are time-domain samples and each linear convolutional filter comprises a set of taps, each tap being configured to compute a product $C_{mn}\vec{A}^H(t_{j+m+n})\vec{A}(t_{j+n})$, where $C_{mn}$ is a complex number representing an efficiency of nonlinear interaction; m and n are index values that range between $-M \leq m \leq M$ and $-N \leq n \leq N$; $\vec{A}(t)$ is a vector representing the modulated time domain transmit signal; $t_j$ denotes the time of the first sample; and $\vec{A}^H(t)$ denotes the Hermitian conjugate of $\vec{A}(t)$; or
the selected set of samples of the signal are frequency-domain samples and each linear convolutional filter comprises a set of taps, each tap being configured to compute a product $\tilde{C}_{mn}\vec{A}^H(\omega_{k+m+n})\vec{A}(\omega_{k+n})$, where $\tilde{C}_{mn}$ is a complex number representing an efficiency of nonlinear interaction; m and n are index values that range between $-M \leq m \leq M$ and $-N \leq n \leq N$; $\vec{A}(\omega)$ is a vector representing the Fourier transform of the modulated transmit signal; $\omega_k$ denotes the frequency of the first sample; and $\vec{A}^H(\omega)$ denotes the Hermitian conjugate of $\vec{A}(\omega)$.

2. The apparatus as claimed in claim 1, wherein the processor is configured to apply the estimated nonlinear interference field to the first sample at either one or both of an optical transmitter and an optical receiver of the optical communications system.

3. The apparatus as claimed in claim 1 wherein a span of the selected set of time domain samples is less than or equal to a channel memory of the optical communications system.

4. The apparatus as claimed in claim 1 wherein the time-domain sample rate is equal to the transmitter symbol rate.

5. The apparatus as claimed in claim 1, wherein $C_{mn}$ is quantized to a predetermined number of levels, and wherein the number of complex multiplication operations used to evaluate the output of each linear convolutional filter is less than the number of filter taps.

6. The apparatus as claimed in claim 1, wherein either electronic or optical dispersion pre-compensation is applied at the optical transmitter.

7. The apparatus as claimed in claim 1, wherein a span of the selected set of frequency domain samples is less than a modulation bandwidth of the optical communications system.

8. The apparatus as claimed in claim 1, wherein the span of the selected set of frequency domain samples corresponds with a nonlinear bandwidth of the optical communications system.

9. The apparatus as claimed in claim 1, wherein the plurality of second samples are frequency samples disposed about the first frequency sample.

10. The apparatus as claimed in claim 1, wherein the first sample comprises a sample of one frequency sub-band and the plurality of second samples comprises samples of one or more frequency sub-bands.

11. The apparatus as claimed in claim 10, wherein the frequency sub-bands are modulated subcarriers.

12. A transmitter configured to transmit a signal through an optical communications system, the transmitter comprising:
a parallel array of linear convolutional filters configured to process a selected set of samples of the signal to calculate an estimate of a nonlinear interference field indicative of a non-linear impairment of the signal traversing the optical communications system, the selected set of samples comprising a first sample and a plurality of second samples; and
a processor configured to apply the estimated nonlinear interference field to the first sample so as to at least partially compensate the nonlinear impairment;
wherein either:
the selected set of samples of the signal are time-domain samples and each linear convolutional filter comprises a set of taps, each tap being configured to compute a product $C_{mn}\vec{A}^H(t_{j+m+n})\vec{A}(t_{j+n})$, where $C_{mn}$ is a complex number representing an efficiency of nonlinear interaction; m and n are index values that range between $-M \leq m \leq M$ and $-N \leq n \leq N$; $\vec{A}(t)$ is a vector representing the modulated time domain transmit signal; $t_j$ denotes the time of the first sample; and $\vec{A}^H(t)$ denotes the Hermitian conjugate of $\vec{A}(t)$; or
the selected set of samples of the signal are frequency-domain samples and each linear convolutional filter comprises a set of taps, each tap being configured to compute a product $\tilde{C}_{mn}\vec{A}^H(\omega_{k+m+n})\vec{A}(\omega_{k+n})$, where $\tilde{C}_{mn}$ is a complex number representing an efficiency of nonlinear interaction; m and n are index values that range between $-M \leq m \leq M$ and $-N \leq n \leq N$; $\vec{A}(\omega)$ is a vector representing the Fourier transform of the modulated transmit signal; $\omega_k$ denotes the frequency of the first sample; and $\vec{A}^H(\omega)$ denotes the Hermitian conjugate of $\vec{A}(\omega)$.

13. A receiver configured to receive a signal through an optical communications system, the receiver comprising:
a parallel array of linear convolutional filters configured to process a selected set of samples of the signal to calculate an estimate of a nonlinear interference field indicative of a non-linear impairment of the signal traversing the optical communications system, the selected set of samples comprising a first sample and a plurality of second samples; and
a processor configured to apply the estimated nonlinear interference field to the first sample so as to at least partially compensate the nonlinear impairment;
wherein either:
the selected set of samples of the signal are time-domain samples and each linear convolutional filter comprises a set of taps, each tap being configured to compute a product $C_{mn}\vec{A}^H(t_{j+m+n})\vec{A}(t_{j+n})$, where $C_{mn}$ is a complex number representing an efficiency of nonlinear interaction; m and n are index values that range between $-M \leq m \leq M$ and $-N \leq n \leq N$; $\vec{A}(t)$ is a vector representing the modulated time domain transmit signal; $t_j$ denotes the time of the first sample; and $\vec{A}^H(t)$ denotes the Hermitian conjugate of $\vec{A}(t)$; or
the selected set of samples of the signal are frequency-domain samples and each linear convolutional filter comprises a set of taps, each tap being configured to compute a product $\tilde{C}_{mn}\vec{A}^H(\omega_{k+m+n})\vec{A}(\omega_{k+n})$, where $\tilde{C}_{mn}$ is a complex number representing an efficiency of nonlinear interaction; m and n are index values that range between $-M \leq m \leq M$ and $-N \leq n \leq N$; $\vec{A}(\omega)$ is a vector representing the Fourier transform of the modulated transmit signal; $\omega_k$ denotes the frequency of the first sample; and $\vec{A}^H(\omega)$ denotes the Hermitian conjugate of $\vec{A}(\omega)$.

14. A method of compensating a nonlinear impairment of a signal traversing an optical communications system, the method comprising:
processing, by a parallel array of linear convolutional filters, a selected set of samples of the signal to calculate an estimate of a nonlinear interference field, the selected set of samples comprising a first sample and a plurality of second samples; and
applying, by a processor, the estimated nonlinear interference field to the first sample so as to at least partially compensate the nonlinear impairment;
wherein either:
the selected set of samples of the signal are time-domain samples and each linear convolutional filter comprises a set of taps, each tap being configured to compute a product $C_{mn}\vec{A}^H(t_{j+m+n})\vec{A}(t_{j+n})$, where $C_{mn}$ is a complex number representing an efficiency of nonlinear interaction; m and n are index values that range between $-M \leq m \leq M$ and $-N \leq n \leq N$; $\vec{A}(t)$ is a vector representing the modulated time domain transmit signal; $t_j$ denotes the time of the first sample; and $\vec{A}^H(t)$ denotes the Hermitian conjugate of $\vec{A}(t)$; or
the selected set of samples of the signal are frequency-domain samples and each linear convolutional filter comprises a set of taps, each tap being configured to compute a product $\tilde{C}_{mn}\vec{A}^H(\omega_{k+m+n})\vec{A}(\omega_{k+n})$, where $\tilde{C}_{mn}$ is a complex number representing an efficiency of nonlinear interaction; m and n are index values that range between $-M \leq m \leq M$ and $-N \leq n \leq N$; $\vec{A}(\omega)$ is a vector representing the Fourier transform of the modulated transmit signal; $\omega_k$ denotes the frequency of the first sample; and $\vec{A}^H(\omega)$ denotes the Hermitian conjugate of $\vec{A}(\omega)$.

15. The method as claimed in claim 14, wherein the estimated nonlinear interference field is applied to the first sample at either one or both of an optical transmitter and an optical receiver of the optical communications system.

16. The method as claimed in claim 14 wherein a span of the selected set of time domain samples is less than or equal to a channel memory of the optical communications system.

17. The method as claimed in claim 14 wherein the time-domain sample rate is equal to the transmitter symbol rate.

18. The method as claimed in claim 14, wherein $C_{mn}$ is quantized to a predetermined number of levels, and wherein the number of complex multiplication operations used to evaluate the output of each linear convolutional filter is less than the number of filter taps.

19. The method as claimed in claim 14, wherein the first sample comprises a sample of one frequency sub-band and the plurality of second samples comprise samples of one or more other frequency sub-bands.

\* \* \* \* \*